N. ZYLIEWICZ.

CANDLE HOLDER.

APPLICATION FILED SEPT. 7, 1912

Reissued Oct. 15, 1912. 13,482.

Witnesses:
M. B. Zyliewicz
H. M. Matthews

Inventor.
N. Zyliewicz
by Carl Prover atty.

UNITED STATES PATENT OFFICE.

NICEFOR ZYLIEWICZ, OF CHICAGO, ILLINOIS.

CANDLE-HOLDER.

13,482. Specification of Reissued Letters Patent. Reissued Oct. 15, 1912.

Original No. 1,034,751, dated August 6, 1912, Serial No. 648,734. Application for reissue filed September 7, 1912. Serial No. 719,691.

*To all whom it may concern:*

Be it known that I, NICEFOR ZYLIEWICZ, being a citizen of the United States, and a resident of the city of Chicago, county of Cook, and State of Illinois, have invented a certain new and useful Candle-Holder, of which the following is a specification.

The object of this invention is to provide a simple, durable, inexpensive and adjustable handle-holder, especially adapted for use in connection with Christmas trees.

Figure 1:
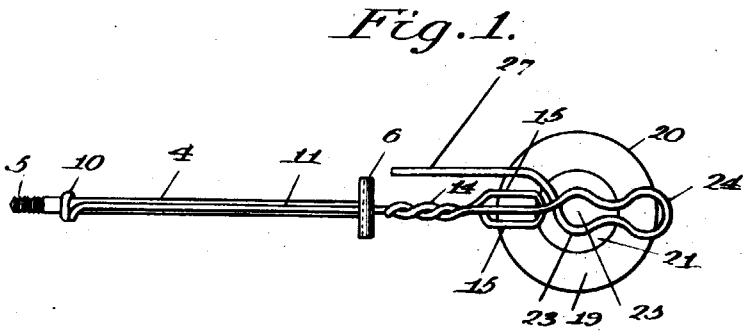
Figure 2:
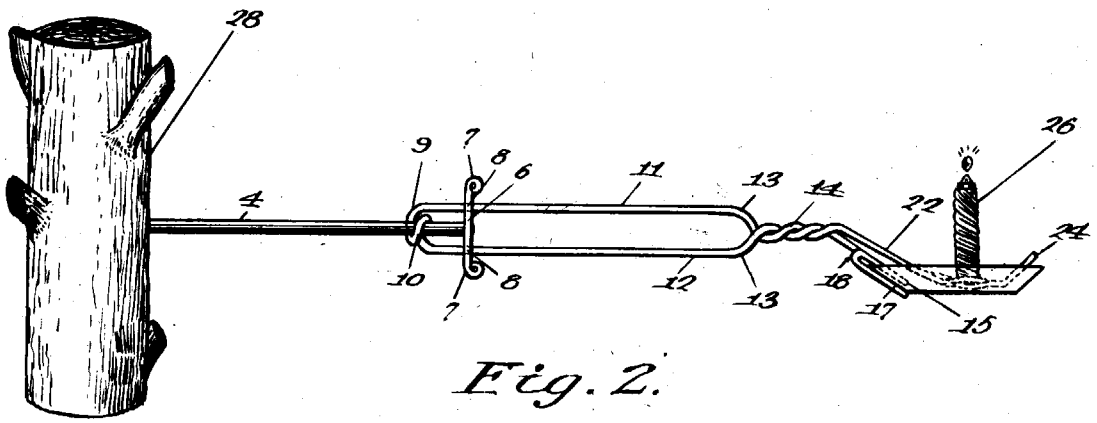

In the drawing Figure 1. is a top plan view of my candle holder in compressed position, and Fig. 2. is a side elevation thereof in extended position, attached to the trunk of a Christmas tree.

Referring to the drawings, stem 4 has at one end thread 5, and has riveted to its other end bracket 6, having curled ends 7, and horizontal openings 8. A wire 9 is formed with loop 10, loosely encircling stem 4, and with two members, 11 and 12, extending from loop 10, through opening 8, and parallel with stem 4, for a distance slightly less than the length of stem 4, to shoulders 13, formed by bending members 11 and 12 toward each other. Adjoining shoulders 13, members 11 and 12 are twisted about each other, so as to form twisted portion 14. Beyond that, member 12 is formed, at a descending angle of about 35° to portion 14, into loop 15. The free portion 17 of member 12 is turned back, with bend 18, under the center of loop 15, terminating opposite lower end of loop 15. Between loop 15 and portion 17 is inserted rim 19 of dished plate 20. This rim is preferably made of such width that it will snugly fit between portion 17 and loop 15, and is formed at the same angle to bottom 21 of plate 20 at which loop 15 stands with reference to portion 14, so that when rim 19 is inserted, with its dished surface upward, between loop 15 and portion 17, bottom 21 is in horizontal position. Member 11, beyond portion 14, has a straight portion 22, sloping downward, substantially parallel with portion 17, to a point approximately above the lower end of loop 15, and beyond that is formed into a double-eyed loop 23, the outer eye 24 of which is bent upward, just above and parallel with, rim 19, diametrically opposite to loop 15, and the inner eye 25 of which is located just above the center of bottom 21. The portion of loop 23 which forms eye 24, constitutes a spring, while the portion forming eye 25 is adapted to encompass and hold the lower end of a candle 26. The free end 27 of member 11 is turned back, parallel with portion 14, so as to constitute a convenient lever, for the expansion of loop 23, for the insertion and release of candles. The threaded end of stem 4 is adapted for insertion into the trunk 28 of a Christmas tree, and for similar purposes; bracket 6 forming a convenient lever for screwing it home. By sliding loop 10 along stem 4, and incidentally moving members 11 and 12 in openings 8, the distance between portion 14 and bracket 6, and with it the distance between candle 26 and trunk 28, may be varied. It is obvious also that loop 23 readily adapts itself to the reception of candles of various sizes. The purpose of plate 20 is to catch drippings from candle 26.

I claim:

1. In candleholders, the combination with a stem provided with fastening means at one end, and with a bracket at the other end, of a wire encircling said stem, having two parallel members mounted in openings in said bracket, and formed into a candle carrier beyond said bracket, substantially as described.

2. In candleholders, the combination, with a member having fastening means, of a wire member, slidably mounted thereon, forming a spring wire candleclamp with one of its ends, and an angularly disposed holder with the other end, and a dished drip-catching member mounted in such holder, substantially as described.

3. In candleholders, the combination with a stem, provided with a wood screw at one end, and a vertical bracket, having two openings, one above, and one below, the stem, at the other end, of a candle carrier slidably mounted on said stem and in said openings.

4. In candleholders, the combination, with a member having fastening means, of a wire member slidably mounted thereon, forming a candleclamp with one of its ends, and a drip-catcher clamp with the other end; and a drip-catcher mounted in such clamp.

5. In candleholders, the combination of fastening means with a double-eyed wire loop, resembling in outline the section of a dumbbell, one loop constituting a spring, and the other a candle clamp operated by said spring.

NICEFOR ZYLIEWICZ.

Witnesses:
JOHN BIELAWSKI,
DOMINICK VIRBSHER.